United States Patent [19]

Mak et al.

[11] Patent Number: 4,524,571
[45] Date of Patent: Jun. 25, 1985

[54] CORN HARVESTER MACHINE WITH MECHANISM FOR PICKING UP DOWNED CORNSTALKS AND RETRIEVING EARS THEREFROM

[76] Inventors: Randall L. Mak, R.R. 1, Box 138A, Fair Oaks, Ind. 47943; Larry W. Young, R.R. 2, Box 300, Wheatfield, Ind. 46392

[21] Appl. No.: 523,046

[22] Filed: Aug. 15, 1983

[51] Int. Cl.³ .............................................. A01D 45/02
[52] U.S. Cl. ............................................ 56/98; 56/119
[58] Field of Search .................... 56/98, 106, 108, 119, 56/94

[56] References Cited

U.S. PATENT DOCUMENTS

3,331,196 7/1967 Grant ...................................... 56/98
3,584,444 6/1971 Sammann .............................. 56/119
3,646,736 3/1972 Grant .................................... 56/106

Primary Examiner—Gene Mancene
Assistant Examiner—David I. Tarnoff
Attorney, Agent, or Firm—McCaleb, Lucas & Brugman

[57] ABSTRACT

A corn harvester machine with an improved corn head for picking up downed cornstalks. The head has some conventional components including a cross auger conveyor with a forwardly open trough and a base portion extending forwardly and downwardly from it, pairs of horizontally spaced stripper plates with gathering chains and snapping rolls running above and below them and defining a plurality stalk-receiving throats. A lower cowl is fixedly mounted between each adjacent pair of stripper plates and a downwardly concave upper cowl is nested over each lower cowl and pivotally journaled to it for up and down tilting movement about a horizontal tilting axis at the cowl rear end portions. A pair of stalk lifting chains are trained for orbital movement between pairs of driving and idler sprockets. The driving sprockets are journaled in the lower cowl about the tilting axis. The idler sprockets are rotatably journaled in a front nose portion of the upper cowl and are vertically movable with it. The lifting chains have exposed paddles trained to move forwardly at ground level beneath the cowls, upwardly around the front nose portion, and have carrying runs which move backwardly along the top of the upper cowl for its full length, overlapping the carrying runs of the gathering chains. The overlapping carrying runs of the lifting and gathering chains run backwardly over the snapping rolls, enabling the lifting chains to pick up downed cornstalks at ground level, lift them around the front nose portion and engage the stalks at two vertically spaced locations to hold them upright as the snapping rolls advance and pull the stalks downwardly between the stripper plates.

11 Claims, 15 Drawing Figures

LIFTING CHAINS COMPLETING ERECTION & GUIDING STALK BACK TOWARD GATHERING CHAIN

Fig. 6d.

STALKS ENGAGED & HELD ERECT BY BOTH LIFTING & GATHERING CHAINS

Fig. 6e.

STALKS BEING PULLED DOWN BY SNAPPING ROLLS

Fig. 6f.

STRIPPED EARS NOW IN THE TROUGH

CORN HARVESTER MACHINE WITH MECHANISM FOR PICKING UP DOWNED CORNSTALKS AND RETRIEVING EARS THEREFROM

BACKGROUND OF THE INVENTION

Modern corn harvesting machines pick corn by removing ears from cornstalks in multiple rows at a time. These machines are quite efficient if the stalks are upright and reasonably free of cross entanglement between adjacent rows. However, none of these conventional machines operate efficiently where a large portion of the crop has been subjected to adverse conditions such as high winds, driving rain, and freezing, causing a substantial portion of the crop to be lost when the corn ear bearing stalks are bent over or flattened against the ground. In this situation, conventional corn harvesting machines function very poorly because they simply pass over the downed stalks, leaving their ears in the field.

One of the problems in conventional corn harvesting machines is that severely downed cornstalks break off at the ground and become tangled and piled on the tops of the row dividing snouts. This requires the operator to stop and clear them by hand from time to time.

In severely downed, wind-flattened corn, farmers often just abandon the crop and collect insurance on it, or they may walk through the field and laboriously salvage as much as they can by hand.

The loss in severely downed corn can be fifteen to twenty bushels per acre, and sometimes more. At one time, this was tolerable because corn fields generally were fenced and most farmers raised cattle and hogs which they turned in to recover the downed corn. Further, it provided an ideal feeding ground for wild game which provided a supplemental food supply and were beneficial in other ways. However, few grain farmers today fence their corn fields or even raise livestock which could be confined in them if they field if it were fenced. Further, the increasing costs of farming provide a real economic incentive to maximize the yield per acre and minimize grain left in the field for wild game.

SUMMARY OF THE INVENTION

Accordingly, a general object of this invention is to provide, in a corn harvester machine, mechanism which, in addition to picking corn from upright stalks, effectively picks up severely downed stalks, and lifts and holds them upright in the corn-receiving throats of the machine so ears can be harvested from them as effectively as from upright stalks.

Another object is to provide a "live" corn harvesting head with forwardly extending row dividing snouts which are self-clearing even in the most severely downed corn by the use of lifting chains running backwardly along the tops of the snouts thereby continually clearing their top surfaces and saving the corn ears on any broken-off stalks by sweeping them backwardly to the cross-auger for separation and recovery in the machine.

Another object is to provide a cowl assembly comprising a forwardly extending, elongated, ground-engaging lower cowl fixedly mounted to a base portion of a corn head along each side of each corn-receiving throat.

Another object is to provide in the cowl assembly a vertically tiltable, elongated, downwardly-concave, ground-engaging upper cowl overlying the lower cowl in nesting relationship with it.

Another object is to provide in the assembly described a pair of paddle-carrying lifting chains, orbitally movable between drive sprockets mounted on a fixed axis in the rear end portion of the lower cowl, and idler sprockets rotatably mounted in a vertically movable front nose portion of the upper cowl.

Another object is to provide in the assembly described, such paddle-carrying lifting chains having carrying runs moving continuously from the underside of the front nose portion of the upper cowl, upwardly around the front nose portion thereof, and then rearwardly along the entire length of the upper cowl to a rear location adjacent the cross conveyor on the corn head.

Another object is to provide separate lifting and gathering chains, the carrying runs of which move backwardly and run along in an overlapping relationship at two different levels above the snapping rolls to provide simultaneous support for the cornstalks at the two levels while the snapping rolls are pulling them downwardly through the stripper plates.

Another object is to provide in the assembly described, a front nose portion for the upper cowl which is curved in a cylindrical contour for guiding the lifting chains smoothly and continuously from the underside to the topside of the cowl assembly.

Another object is to interconnect the lifting and gathering chain drives, and provide a variable speed control, so their respective carrying runs can be adjusted to move backwardly with respect to the machine at a speed matching the forward motion of the machine over the ground so the carrying runs of the two chains remain substantially stationary with respect to a lifted cornstalk supported by them over the snapping rolls.

BRIEF DESCRIPTION OF THE DRAWINGS

Other objects and advantages of the invention will be apparent from the following description taken in connection with the accompanying drawings in which.

Like parts are referred to by like reference characters throughout the figures of the drawings.

DESCRIPTION OF THE PREFERRED EMBODIMENT

Referring now to the specific embodiment of the invention in the drawings, the numeral 20 generally indicates a self-propelled corn harvesting machine including a corn harvesting head 22 incorporating one form of the present invention mounted on the forward end of a mobile, self-propelled main frame 24.

The invention is readily applied to a wide variety of conventional harvester combines including those of International Harvester Company, John Deere, Allis-Chalmers Company and others. Further, it is adaptable to multi-row machines of any size from small two-row combines up to twelve rows and larger. These conventional harvesting machines include an operator's cab 26 at the extreme forward end of the main frame with mechanism and controls (not shown) for tramming it at variable speeds along corn rows 28 and for moving the corn head 22 up and down to a selected elevation. These mechanisms are conventional, so this description will not be unnecessarily lengthened by including them.

The corn head 22 comprises a number of conventional components which cooperate with certain additional components of the present invention. Among these conventional corn head components are a cross auger conveyor 30 with a forwardly open trough 32, a base frame portion 34 extending forwardly and downwardly from the trough, pairs of horizontally spaced stripper plates 36, 36 defining a plurality (in this case, four) of forwardly open corn-receiving throats 38, pairs of gathering chains 40, 40 with outwardly extending gathering paddles 42, each gathering chain having a carrying run 44 movable backwardly and upwardly along the corresponding stripper plate 36, and snapping rolls 46, 46 beneath the stripper plates. Inasmuch as these components are conventional, they, also, will not be described here in detail. However, for more detailed descriptions, reference may be had to U.S. Pat. No. 3,271,940 which shows and describes a cross auger conveyor (52), stripper plates (132, 132), gathering (148, 148) with fingers or paddles (150), and snapping rolls (100, 100).

Directing attention now to the novel components of the present invention which cooperate with certain of the above-mentioned conventional components to pick up severely downed corn stalks, these comprise a plurality of active row dividers, including three intermediate row dividers 48 and two end row dividers 50. The number of intermediate row dividers will vary with the number of rows of corn handled by the machine. These dividers are basically the same except that the end dividers 50 are only half as wide as intermediate dividers 48. Accordingly, only one of the dividers 48 will be described in detail, as representative of them all.

The corn head 22 comprises the base frame portion 34 extending forwardly and downwardly from the trough 32. In the embodiment shown, it comprises pairs of forward extensions 52, 52 for each of the intermediate row dividers 48. Each of the end dividers 50 is supported on a single extension 52.

Each intermediate row divider 48 comprises a lower cowl 54, an upper cowl 56, and a pair of lifting chains 58. Each end row divider 50 comprises a lower cowl 54a, an upper cowl 56a and a single lifting chain 58a.

Each lower cowl 54 comprises a forwardly extending, downwardly concave housing 60 having side walls 62, 62, a rear wall 64, and an open top wall 66. It is removably fastened to the front of the base frame portion 34 by a pair of hinge fittings 69 having curved forward extensions 68 engaging a pair of apertured brackets 70, 70, and to the rear of the base frame portion by a pair of clamps 72. Each clamp is removably connected between a boss 73 on back wall 64, and a bracket 75 on base frame portion 34. Each end lower cowl 54a is similarly fastened.

Each gathering chain 40 is trained for orbital movement between drive and idler sprockets 74 and 76 which are rotatably journaled on the base frame portion 34.

Figure 5:
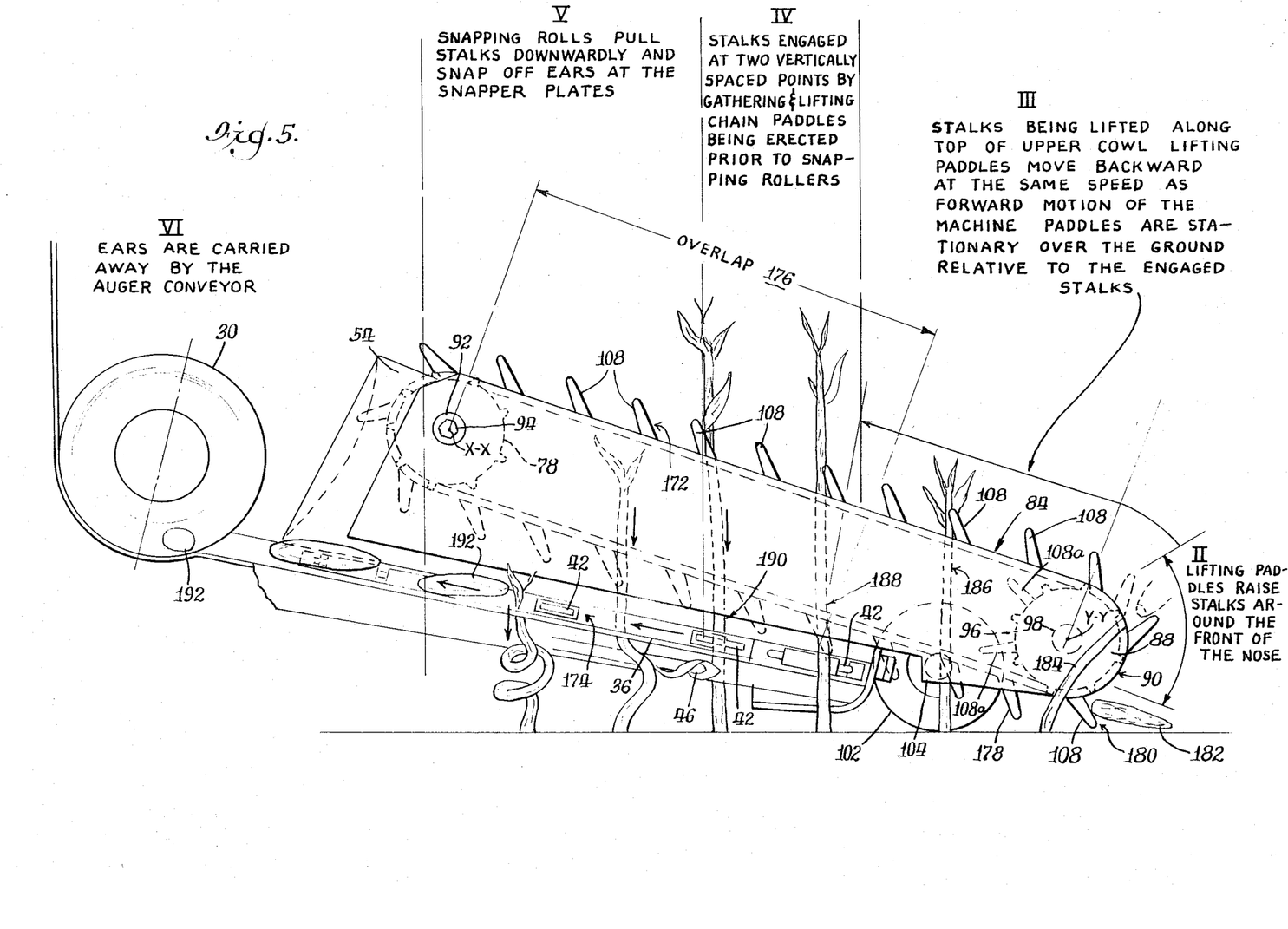
FIG. 5 is a fragmentary enlarged view of FIG. 1 taken along line 5—5 and illustrating a six-step sequence in picking downed corn off the ground and conveying stripped corn ears into the main body of the machine.
Figures 7, 7A:
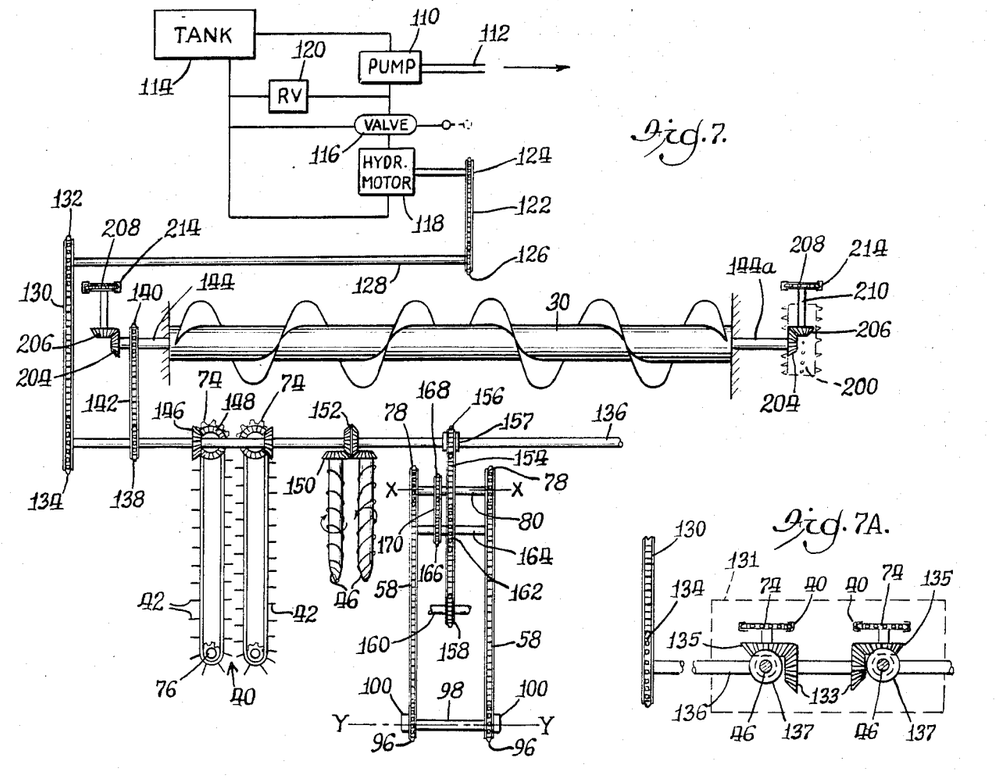
FIG. 7 is a schematic drawing showing the variable speed, common drive system for the lifting and gathering chains, and the snapping rolls and transverse auger conveyor.
FIG. 7A is a common drive arrangement for the gathering chains and snapping rolls illustrating an alternative to that shown in FIG. 7.
Figure 8:
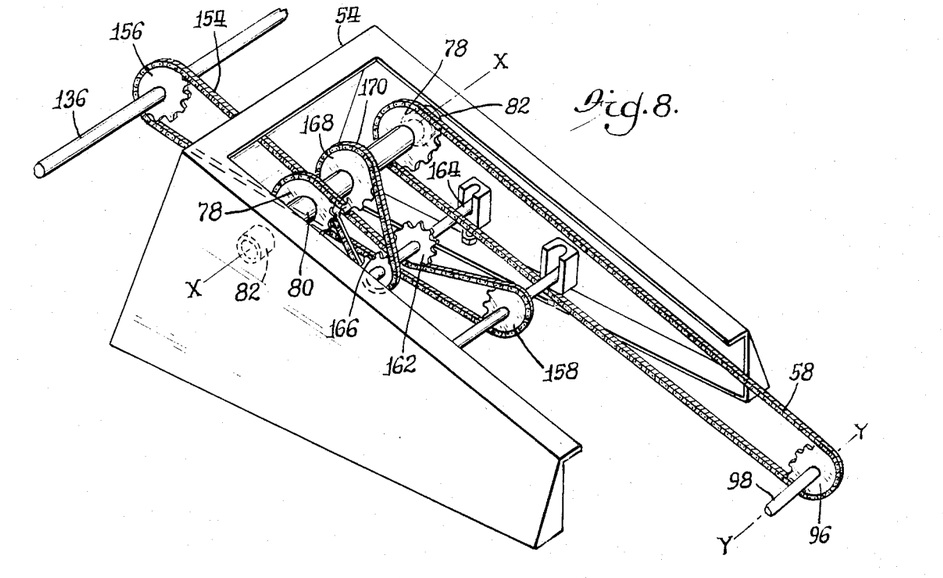
FIG. 8 is a fragmentary perspective view of a portion of the drive mechanism shown in FIG. 7.

As shown in FIGS. 5, 7 and 8, a pair of lifting chain drive sprockets 78, 78 are mounted on a drive shaft 80 which is journaled within bearings 82, 82 (FIG. 8) in the inner cowl for rotation about a transverse axis x—x at the upper rear portion of the lower cowl.

Each upper cowl 56 comprises a forwardly extending, elongated, downwardly concave housing positioned over the lower cowl 54 in nesting relationship therewith. It has a flat top wall 84, a pair of downwardly extending side walls 86, 86, and a curved front nose portion 88 with a front, cylindrically-curved nose wall 90 extending forwardly from the top wall and wrapping around to the bottom of the nose portion as best shown in FIG. 5. The front nose portion is located forwardly of the lower cowl. The upper cowl is pivotally journaled to the lower cowl about the previously described axis x—x by means of bearings 92 fastened on the outer cowl and held in place by axial bolts 94. The front cylindrical wall 90 has a cylindrical contour curving about a transverse axis y—y.

When an upper cowl is elevated about axis x—x, the side walls 62 of the lower cowl act as barriers preventing loss of corn from the throat areas.

A pair of lifting chain idler sprockets 96, 96 are mounted within the nose portion on a shaft 98 which is journaled in bearings 100, 100 for rotation about the above-mentioned axis y—y.

Figure 3:
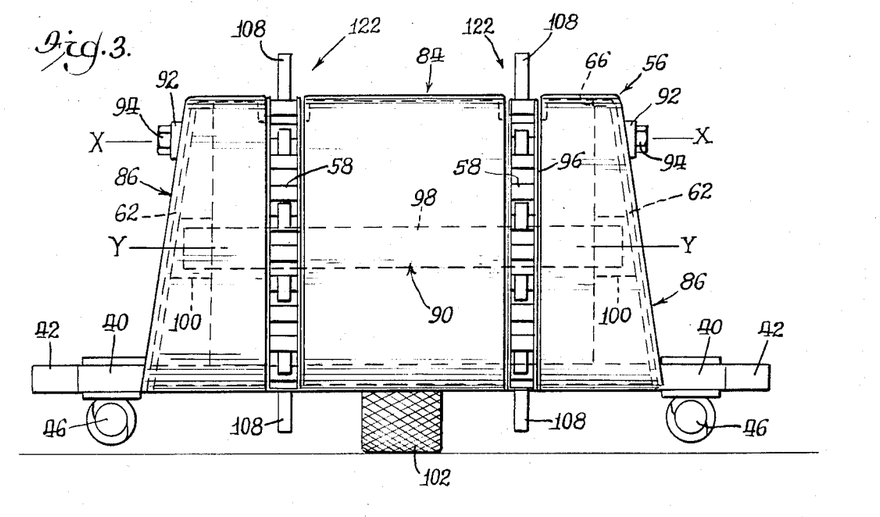
FIG. 3 is a fragmentary enlarged view of FIG. 1 showing a front view of one of the cowl assemblies.
Figure 3A:
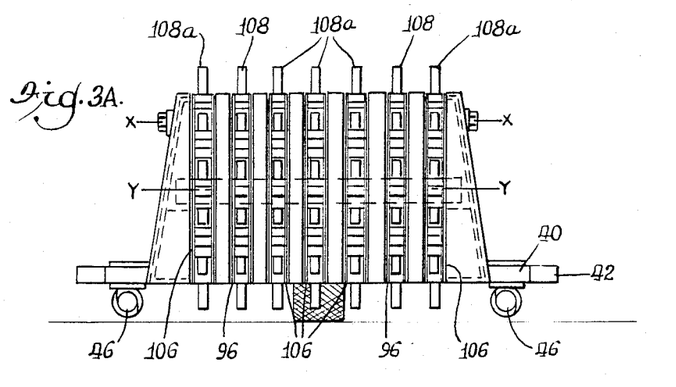
FIG. 3A is a view similar to FIG. 3 of an alternative cowl assembly.

An alternative cowl assembly is shown in FIG. 3A. In addition to the idler sprockets 96 which are mounted for rotation with idler shaft 98, a plurality of pick-up disks 106 (in this case, five) are likewise mounted on the idler shaft for rotation therewith. Each disk has a plurality of paddles 108a. All paddles 108 and 108a rotate synchronously with shaft 98, being driven through lifting chains 58. This greatly improves pickup of stalks beneath the snouts.

Figure 4:
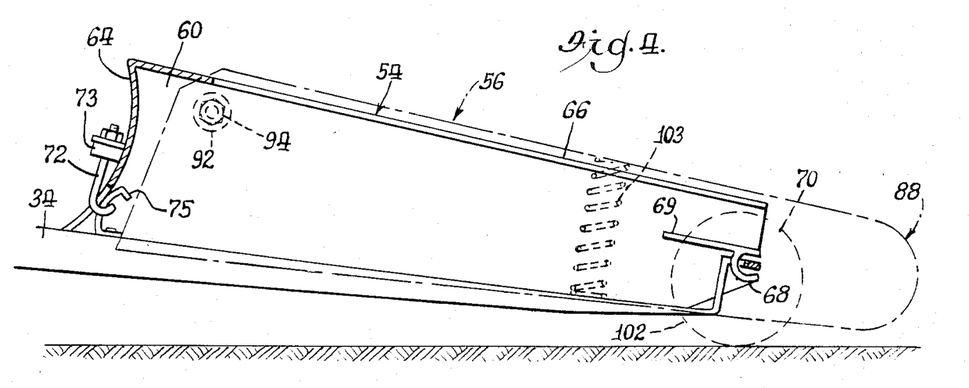
FIG. 4 is a fragmentary enlarged view of FIG. 3 taken on line 4—4 and showing the mounting arrangement for one of the lower cowls.

A ground supporting wheel 102 is centrally mounted on the underside of the upper cowl front nose portion 88 and is vertically adjustable within bracket 104 to vary its proximity with respect to the ground while enabling the upper cowl to float or tilt up and down about axis x—x at the rear of the cowl assembly to follow variations in ground contour. In some cases where the ground is very soft or muddy, one or more springs 103 (FIG. 4) may be seated on the base frame 34 or on the lower cowl and bear upwardly against the underside of the upper cowl 56 to eliminate some of the weight from the wheel and provide an upward assist in raising the upper cowl.

Each lifting chain 58 has a number of outwardly extending paddles 108, trained for orbital movement with the chain between the above-described pairs of driving and idler sprockets 78 and 96 respectively.

As best shown in FIG. 7, the active components in the corn head 22 are driven simultaneously at selected speeds from a power take-off on the main frame as follows. A pump 110 is driven by a power take-off shaft 112. The pump draws hydraulic fluid from a tank 114. Fluid from the pressure side of the pump flows through a manually adjustable control valve 116, preferably located in the cab 26, and directs it to a hydraulic motor 118, returning it to the tank. A relief valve 120 bypasses fluid from the pump to the tank as required. A first drive chain 122 connects motor sprocket 124 to a sprocket 126 on shaft 128. A second drive chain 130 interconnects sprockets 132 and 134, the latter being on cross shaft 136 which is suitably rotatably mounted across the rear end portion of the corn head. Sprockets 138 and 140 drive the auger 30 through chain 142 and shaft 144. Gathering chains 40 with outwardly extending paddles 42 are orbitally movable between drive and idler sprockets 74 and 76 respectively. Each drive sprocket 74 is driven from cross shaft 136 by means including a matching pair of beveled gears 146 and 148. For a simplified presentation in the drawings, snapping rolls 46, 46 are illustrated in FIG. 7 as driven by matching pairs of beveled gears 150, 152. In actual practice, though somewhat more complicated to illustrate in the schematic drawing of FIG. 7, the drives for the gathering chains 40 and the snapping rolls 46 likely be combined in a single gear box 131 as shown in FIG. 7A where beveled gears 133 on shaft 136 drive beveled gears 135 connected to gathering chain drive sprockets 74. Beveled gears 135 also drive beveled gears 137 which are connected to snapping rolls 46. And each lifting chain drive shaft 80 is driven from shaft 136 as follows: drive chain 154 is orbitally movable between sprockets 156 and 158 on shafts 136 and 160 respectively. Chains 154 on each snout may be removed to stop movement of the lifting chains; alternatively, a manually- or power-operable clutch 157 (FIG. 7) may disconnect sprocket 156 from shaft 136 to turn off the lifting chains 58 as for example when the cornstalks are erect and the lifting chains are not needed. Another sprocket 166 on the counter shaft 164 drives a sprocket 168 through chain 170. This rotates shaft 80 which carries the lifting chain drive sprockets.

It will be understood that the above-described arrangement for driving the lifting chains 58 is subject to considerable variation. For example, by suitably sizing sprockets 156 and 168 and placing them in alignment, a chain (not shown) may interconnect them and drive shaft 80 directly from shaft 136, thereby eliminating sprockets 158, 162, 166 and 168 and associated parts. Alternatively, a direct gear connection (not shown) may interconnect the drive for the gathering chains 40 and lifting chains 58.

An important feature of this invention is that the sprockets and gears involved in driving the gathering and lifting chains are suitably sized to move their carrying runs backwardly at identical speeds, for reasons which will be apparent as this description proceeds. The actual gearing and sprocket arrangements shown are presented merely by way of illustration and are not limiting in any way. While the shaft 136 is illustrated as a common source of power for all the row divider heads, separate shafts may be provided at the sides of the head on eight-row and larger harvesters furnishing power to the heads on the opposite sides, and a completely separate source of power, such as shaft 128 or otherwise, may be provided for the center row divider.

As aforementioned, the top surfaces of the upper cowls 56a on the outboard dividers are inclined upwardly and rearwardly. During operation, the downed stalks tend to drape over the outboard upper cowl while they are being dragged upwardly and rearwardly along the upper surface. The stalks in the outer throats tend to bunch up at the rear end and block passage into the auger 30. To prevent this, and maintain flow into the auger, a short, longitudinally extending roller 200, preferably with external teeth 202, is rotatably driven on the top of the corn head adjacent each end of the auger. It may be driven in any suitable way. Here, there is a power take-off from opposite ends of the auger. As shown in FIG. 7, this includes shafts 144 and 144a at each end. Each shaft drives beveled gears 204 and 206 which drives a lower sprocket 208 through shaft 210. Lower sprocket 208 is connected to an upper sprocket 212 by chain 214 which extends upwardly through opening 216 in the top of the corn head. Sprocket 212 is mounted on roller shaft 218 and the roller is rotatably journaled in bearings 220 and 222.

In use, the operator in cab 26 will steer the harvester combine to run parallel to the corn rows 28 with each throat 38 aligned with a corresponding row, and at a selected ground speed appropriate for the corn and ground conditions.

Then, by manipulating the corn head speed control valve 116, the operator can adjust the speed of the lifting and gathering chains so their carrying runs 172 and 174 respectively will move backwardly relative to the machine at substantially the same speed as the forward motion of the machine relative to the ground. This means that both corn-engaging carrying runs, in effect, "stand still" with respect to the engaged cornstalks and the ground as the machine advances over them.

Another very important feature of the invention, in combination with the additional features that the carrying runs 172, 174 are interconnected to move at the same speed, and the capability of adjusting the chain speed to match the ground speed of the machine, is that these carrying runs overlap one another along a substantial common distance above the snapping rolls and stripper plates. This overlap occurs in the distance marked "overlap 176" in FIG. 5.

Thus, once downed cornstalks are lifted by chains 58, as will be explained, the vertically spaced over-and-under relationship of the lifting and gathering chains in the overlap distance 176, provides two vertically spaced support locations for maintaining the lifted cornstalks upright within the throats 38 while they are being pulled downwardly through the stripper plates by the snapping rolls. This enables the corn head to harvest corn ears from downed stalks as effectively as from upright stalks. Otherwise, this corn would be lost and left wasted in the field.

Use and operation of the machine is believed to be apparent from the above description. Briefly however, with particular reference to FIGS. 5 and 6a–6f, operation in picking up and harvesting downed corn may be visualized as occurring in six steps indicated I through VI in those figures.

Referring to FIGS. 5 and 6a–6f, assume that the machine is moving through a corn field parallel to corn rows 28 at, say, six miles per hour, and that the carrying runs of the lifting and gathering chains have been adjusted by speed control valve 116 to move backwardly at the same speed. This cancels out the forward movement of the machine. The paddles on the carrying runs 172 and 174 in effect stand still over the corn while the machine advances over them.

As best shown in FIG. 5, the lower, forward segments 178 of the lifting chains extend along just above the ground forwardly of the lower cowl 54. As determined by the vertical adjustment of the guide wheel 102, this places the lifting chain paddles 108 and pick-up disk paddles 108a in the segments 178 close to the ground during Step I in the area immediately beneath the front nose portion 88 of the upper cowl. Inasmuch as the speed of the upper, carrying runs 172 of the lifting chains is adjusted to run backwardly at substantially the forward ground speed of the machine, this means the lifting paddles 108 in segments 178 move forwardly at twice the ground speed of the machine. This enables the lifting and pick-up paddles 108 and 108a at location marked 180 (FIG. 5) to sweep forwardly quickly, engage a downed cornstalk 182 and displace it forwardly toward the open space ahead of the curved front nose wall 90. Step I is shown in plan view in FIG. 6a.

Figure 6A:
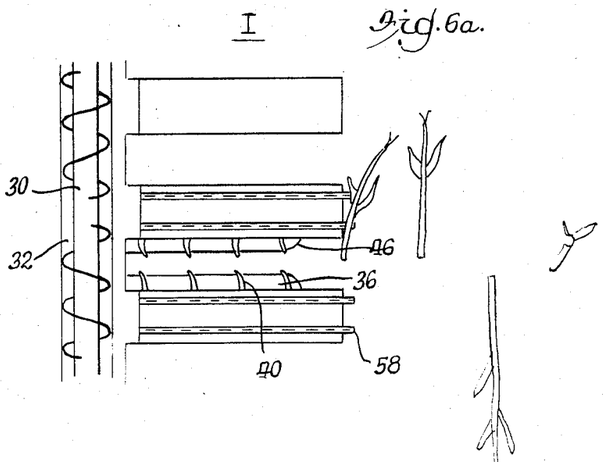
FIGS. 6a–6f are fragmentary plan views of FIG. 5 for each of the steps shown in FIG. 5.
Figure 6B:
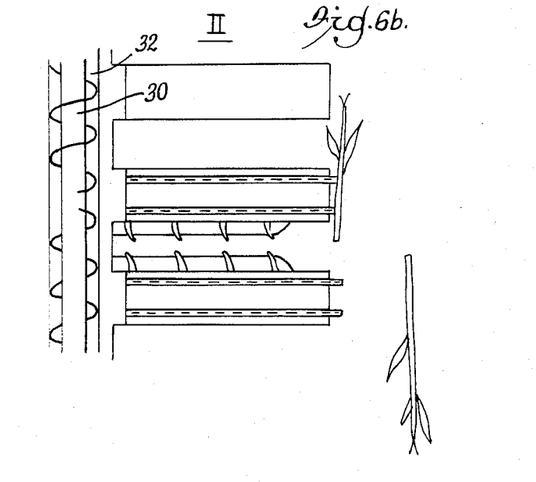

Step II is shown in FIGS. 5 and 6b. Here, the lifting paddles 108 raise the previously engaged stalks to the top wall 84 of the upper cowl as the machine advances. A cornstalk at this position is indicated by the numeral 184 in FIG. 5 where it is being lifted toward an erect position.

Figure 6C:
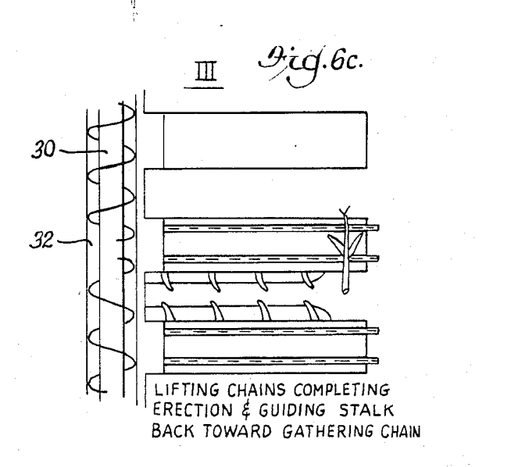

Step III is shown in FIGS. 5 and 6c. Here, a cornstalk 186 is being lifted and further straightened to a substantially erect position as the upwardly and backwardly inclined top surface 84 moves forward, cam-like, beneath it. It will be understood that the lifting paddle 108 engaging the cornstalk above surface 84 remains stationary over the ground because of the speed differentials described.

Figure 6D:
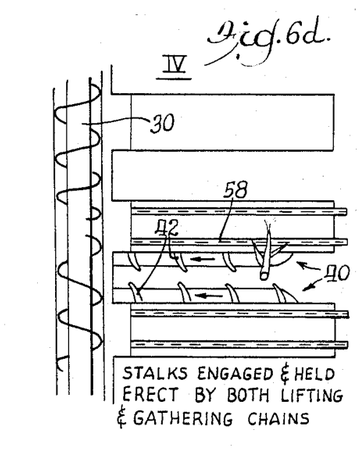

Step IV is shown in FIGS. 5 and 6d. This illustrates an extremely important feature of the invention referred to above, namely engagement of the stalk by the gathering and lifting chains at two vertically spaced locations to hold it erect while it is being pulled down by the snapping rolls. At location 188, the cornstalk continues to be engaged by the same lifting paddle 108 which engaged it at location 180 beneath the nose; in addition, it is engaged at a lower level by one of the gathering chain paddles 42. The cornstalk continues to be straightened and lifted between locations 188 and 190 (FIG. 5).

Figure 6E:
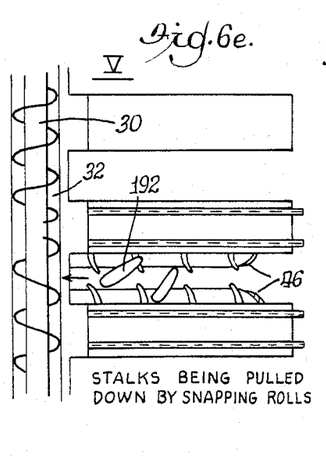

Step V is shown in FIGS. 5 and 6e. During this step, the stalk continues to be held upright by engagement at the two vertically spaced locations by the lifting and gathering chain paddles. In addition, at location 190, the machine has advanced to cause the erected stalk to be grasped between the pair of snapping rolls 46. In this Step V, each cornstalk is now engaged at three vertically spaced locations: (1) at the top by a lifting chain paddle 108 where the stalk wraps over the upper corner of the upper cowl; (2) at a lower position, by a gathering chain paddle 42; and (3) between the snapping rolls 46. As shown by the arrows in FIG. 5, the stalk is now being pulled down through the stripper plates 36 to strip off the ears 192.

Figure 6F:
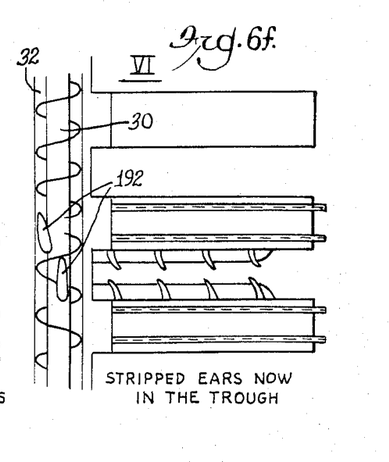

Step VI is shown in FIGS. 5 and 6f. Here, the stripped off ears are conveyed rearwardly and upwardly to the auger conveyor 30 where they are transferred through the head frame opening 194 (FIG. 3) for shelling and cleaning in the main frame.

In badly downed corn, many stalks lying across the upper cowl will be broken off at the ground. In that case, they will be carried backward to the auger 30 by the lifting chains for transfer and separation in the machine.

Another important feature of the invention is the continuity of contact between the lifting chain paddles 108 and each cornstalk being straightened. From the time a particular lifting chain paddle 108 engages a particular downed cornstalk at location 180 beneath the curved front nose portion, that same paddle continues to engage, lift and guide the cornstalk all the way through to location V where the snapping rolls strip off the ears on the stripper plates. There is no loss or breakage of cornstalks due to transfer from one lifting chain to another. Instead, there is an orderly, progressive addition of supporting forces to the stalks, first at location 180 under the nose portion where the lifting chain picks the downed stalk off the ground, second at location 188 where the gathering chain paddles engage the cornstalk and add a second support; and third at location 190 where the snapping rolls start to engage the stalk and pull it downwardly while it remains supported upright by continued engagement with the gathering and lifting chain paddles.

Figure 1:
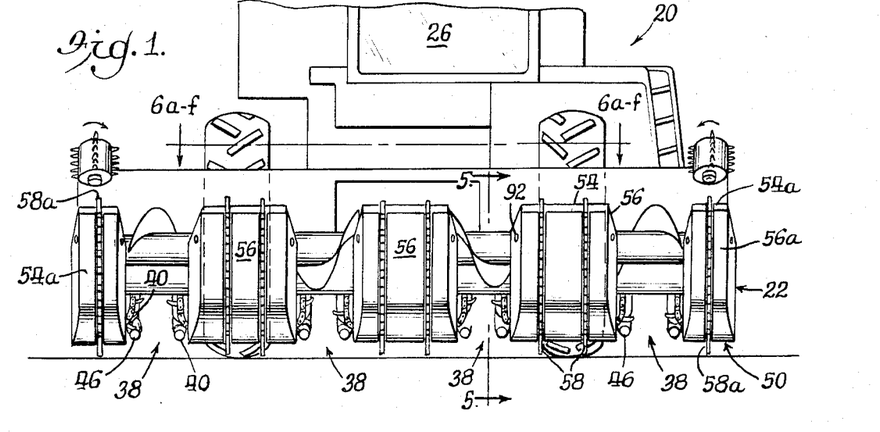
FIG. 1 is a front view of a harvester combine machine with a corn head illustrating one embodiment of the present invention.
Figure 2:
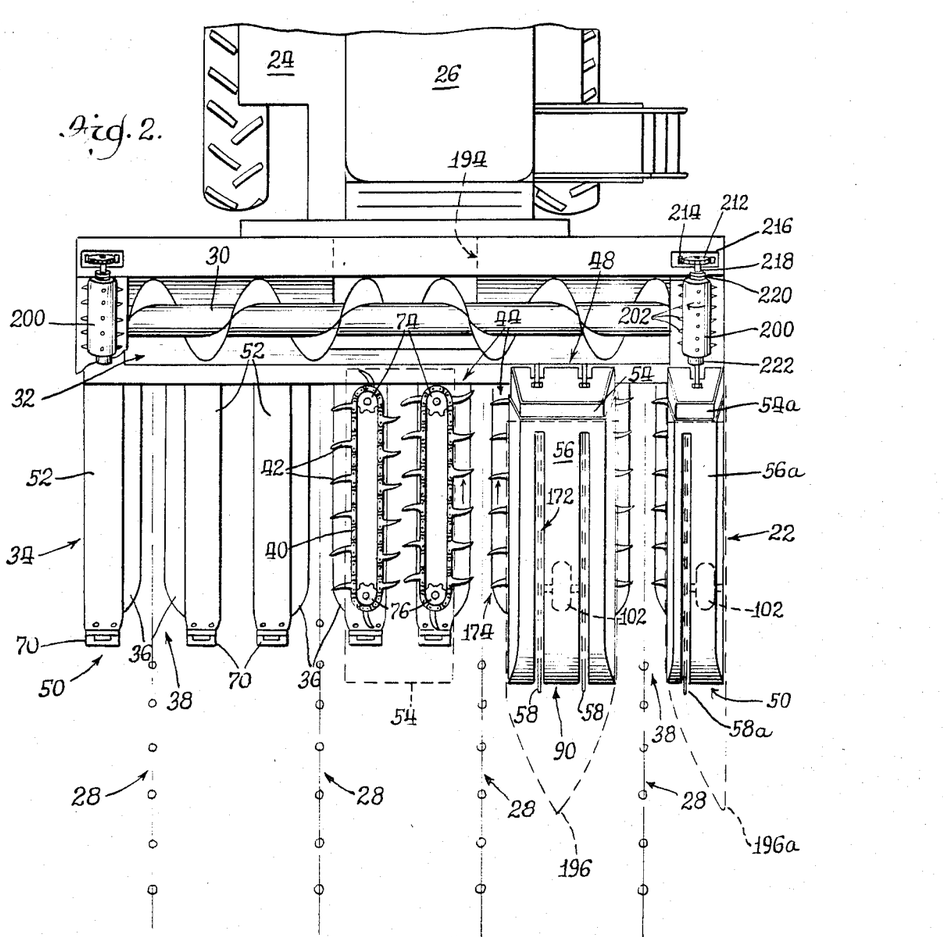
FIG. 2 is a top plan view of FIG. 1 with some of the components removed.

The lifting chains 58 are beneficial primarily in harvesting badly downed corn. If the stalks are erect, the lifting chains will not be needed. In that case, they may be disconnected and temporarily disabled by removing chains 154 or opening clutches 157 and placing forwardly pointed row-dividing cover snouts 196 and 196a (FIG. 2) similar to conventional row dividers on the upper cowls and hooking them in place by some convenient connecting means so they float up and down with the upper cowls and wheels 102. The corn head will then function without creating unnecessary wear on the lifting chains.

The embodiment described and shown to illustrate the present invention has been necessarily specific for purposes of illustration. Alterations, extensions and modifications would be apparent to those skilled in the art. The aim of the appended claims, therefore, is to cover all such alterations and modifications as fall within the spirit and scope of the invention.

The embodiment described and shown to illustrate the present invention has been necessarily specific for purposes of illustration. Alterations, extensions and modifications would be apparent to those skilled in the art. The aim of the appended claims, therefore, is to cover all such alterations and modifications as fall within the spirit and scope of the invention.

The embodiments of the invention in which an exclusive property or privilege is claimed are defined as follows:

1. In combination with a harvester having a forward frame with forwardly open throats adapted to receive rows of grain-bearing stalks, pairs of gathering chains and snapping rolls located respectively above and below pairs of horizontally spaced stripper plates in each throat, and a cross conveyor with a forwardly open trough to receive grain from said throats, an improved row divider between each adjacent pair of throats comprising:

a lower cowl fixedly mounted on the frame above the stripper plates; and an upper cowl having a downwardly concave shape positioned over the lower cowl in substantially co-extensive, nesting relationship therewith, said upper cowl having a rearwardly and upwardly inclined top surface and a curved front nose portion ahead of the lower cowl with ground-engaging support means on the underside thereof and having a rear end portion connected to the lower cowl for up and down tilting movement about a horizontal tilting axis;

a pair of stalk lifting chains trained between pairs of driving and idler sprockets adjacent the upper side edges of the upper cowl, said driving sprockets being rotatably mounted about said horizontal tilting axis within the rear end portion of the lower cowl and said idler sprockets being rotatably mounted about a horizontal axis in the front nose portion of the upper cowl and tiltably movable up and down therewith about said horizontal tilting axis;

said lifting chains moving forwardly at ground level beneath said front nose portion, upwardly around said nose portion, and rearwardly along the upper sides of the top surface of the upper cowl to the rear end thereof;

substantial stalk-engaging runs of the gathering and lifting chains extending in rearwardly moving, lapping, vertically spaced relationship with one another above and lengthwise of the snapping rolls;

means for driving said stalk-engaging runs of the gathering and lifting chains rearwardly at a speed matching the forward ground speed of the machine enabling said stalk-engaging runs to remain substantially stationary relative to the stalks and the ground while providing continuous vertically spaced supports for holding the stalks upright above the snapping rolls within the throat while the machine advances;

whereby the stalk lifting chains are effective to continuously displace stalks forwardly from beneath the front nose portion, upwardly around the forward end thereof, and hold the stalks upright within the throat and stationary with respect to the ground while the machine moves the upper cowl forwardly to elevate the stalks and hold them erect at vertically spaced locations above the snapping rolls while the stalks are pulled downwardly through the stripping plates to remove the grain therefrom.

2. In combination with a harvester, an improved row divider according to claim 1 in which the lifting chains have stalk-engaging portions extending continuously and uninterruptedly from the underside of the front nose portion to the rear end of the upper cowl adjacent the cross conveyor.

3. In combination with a harvester, an improved row divider according to claim 2 in which said idler sprockets are mounted for rotation with an idler shaft rotatably journaled in the front nose portion of the upper cowl, a plurality of pick-up disks are mounted on said idler shaft for rotation therewith, and said lifting chains and pick-up disks have outwardly extending paddles synchronously movable with said idler sprocket to pick up stalks beneath the nose portion and elevate them around the front of the nose portion to the top thereof.

4. In combination with a harvester, an improved row divider according to claim 1 in which the gathering and lifting chains have outwardly extending paddles simultaneously engageable with the stalks in two vertically spaced positions over the snapping rolls to maintain the stalks sufficient erect to thereby facilitate a harvesting operation while the stalks are pulled downwardly through the stripper plates.

5. In combination with a harvester, an improved row divider according to claim 1 in which the ground-engaging support means on the underside of the upper cowl is a wheel with means for adjusting it relative to the upper cowl to vary the proximity of the lower runs of the lifting chains relative to the ground.

6. In combination with a harvester, an improved row divider according to claim 1 in which the lifting chains are trained between the driving and idler sprockets for orbital movement in parallel vertical planes and said lifting chains have upper carrying runs guided for movement along the top surface of the upper cowl closely adjacent opposite edges thereof to facilitate engaging stalks lying across it.

7. In combination with a harvester, an improved row divider according to claim 1 in which fore and aft ends of the lower cowl are removably connected to the harvester frame independently of the gathering and lifting chains, stripping plates, and snapping rolls to facilitate maintenance access thereto.

8. In a corn harvester machine having a mobile main frame, variable speed tram drive means for moving the machine forwardly at a selected speed along a plurality of rows of corn, a corn harvesting head at the front of the main frame having a cross conveyor with a forwardly open trough to convey ears of corn inwardly from the sides of the corn head to a central outlet opening leading to the main frame and having a base portion extending forwardly and downwardly from the trough across the width of the corn head, the base portion having pairs of horizontally spaced stripper plates defining a plurality of forwardly open throats adapted to be aligned with a corresponding plurality of rows of corn, pairs of gathering chains with carrying runs having outwardly extending gathering paddles movable backwardly in carrying runs along the stripper plates, and pairs of snapping rolls beneath the stripper plates effective to pull cornstalks downwardly therebetween to strip corn ears from the stalks, improved mechanism for picking up downed cornstalks comprising:

a lower cowl comprising a forwardly extending elongated housing between each adjacent pair of throats fixedly mounted to the base portion above the stripper plates;

an upper cowl comprising a forwardly extending elongated downwardly concave housing positioned over the lower cowl in nesting relationship therewith, having a curved front nose portion extending forwardly of the lower cowl and being pivotally journaled to the lower cowl for up and down tilting movement about a common horizontal tilting axis at the rear end portions of both cowls;

a pair of lifting chains with outwardly extending lifting paddles in parallel vertical planes adjacent the upper side edges of the upper cowl, being orbitally movable between a pair of driving sprockets and a pair of idler sprockets, said driving sprockets being mounted on a fixed drive shaft rotatably journaled in the lower cowl for rotation about said horizontal tilting axis, said idler sprockets being mounted on an idler shaft rotatably journaled about a horizontal axis in said front nose portion of the upper cowl and tiltably movable up and down therewith;

said lifting chains having lifting paddles moving forwardly at ground level beneath said front nose portion, upwardly around said nose portion, and rearwardly along the top of the upper cowl in continuous, uninterrupted stalk erecting and carrying runs from the nose portion to the rear end of the upper cowl adjacent the cross conveyor;

a substantial portion of the carrying runs of the gathering and lifting chains extending in lapping, vertically spaced relationship along the cowls over the snapping rolls and stripper plates;

means for driving the gathering and lifting chains at the same lineal speed, and manually adjustable speed control means variable to move the carrying runs thereof backwardly at a speed matching the forward ground speed of the machine thereby enabling the paddles in the carrying runs to remain substantially stationary relative to the stalks while providing vertically spaced supports for erected stalks while the machine is advancing;

whereby when the gathering and lifting chains are driven with their conveying runs moving backwardly at the forward speed of the machine, downed cornstalks are picked up and processed as follows:

(a) cornstalks beneath the forward nose portion of the upper cowl are displaced forwardly along the ground to the forward end of said nose portion by the lifting chain paddles;

(b) the cornstalks are lifted around said nose portion to the top of the upper cowl by the lifting chain paddles;

(c) the machine moves the cowls forwardly while the cornstalks are engaged by the lifting paddles to cause the upwardly inclined surface of the upper cowl to erect the cornstalks; and (d) the machine continues to move the cowls forwardly while the cornstalks are maintained erect by simultaneous engagement with both the gathering and lifting chain paddles as the cornstalks are pulled downwardly by the snapping rolls to remove the ears on the stripper plates.

9. In the combination with a harvester according to claim 1, additional, outboard row dividers flanking the side throats at opposite sides of the frame, said outboard row dividers having the same general configuration as said row dividers between each adjacent pair of throats and including upper and lower cowls with stalk lifting chains trained between driving and idler sprockets and having carrying runs movable backwardly along inner side edges adjacent and immediately above the corresponding side throats.

10. In the combination with a harvester according to claim 9, the sides of said forward frame having end walls at opposite ends of the forwardly open trough, roller means on said end walls disposed behind said outboard row dividers, and means for rotatably driving said roller means to transfer stalks draped over said end walls into the end portions of the cross conveyor.

11. In the combination with a harvester according to claim 9, forwardly pointed cover snouts attachable to each of said row dividers to cover the lifting chains and provide a smooth guiding surface for upright stalks, and means for disenabling the drives for said lifting chains when said cover snouts are in place and the lifting chains are not needed as for example when harvesting upright cornstalks.

* * * * *